US005889214A

United States Patent [19]
Kang et al.

[11] Patent Number: 5,889,214
[45] Date of Patent: Mar. 30, 1999

[54] 6-COMPONENT LOAD CELL

[75] Inventors: Dae Im Kang; Gab Soon Kim; Hou Keun Song, all of Taejon, Rep. of Korea

[73] Assignees: Korea Research Institute of Standards and Science, Taejon; Cas Co., Ltd., Kyunggi-do, both of Rep. of Korea

[21] Appl. No.: 892,937

[22] Filed: Jul. 15, 1997

[30] Foreign Application Priority Data

May 19, 1997 [KR] Rep. of Korea .................. 1997-19335

[51] Int. Cl.$^6$ ..................................... G01L 5/16
[52] U.S. Cl. .............................. 73/862.044; 73/862.043
[58] Field of Search ...................... 73/862.041, 862.042, 73/862.043, 862.044, 862.045

[56] References Cited

U.S. PATENT DOCUMENTS

| 4,448,083 | 5/1984  | Hayashi .............................. 73/862.042 |
| 4,485,681 | 12/1984 | Hatamura ............................ 73/862.041 |
| 4,520,679 | 6/1985  | Hatamura ............................ 73/862.042 |
| 4,573,362 | 3/1986  | Amlani .............................. 73/862.045 |
| 4,674,339 | 6/1987  | Hatamura et al. ................. 73/862.044 |
| 4,763,531 | 8/1988  | Dietrich et al. .................... 73/862.044 |

OTHER PUBLICATIONS

Akihiko Yabuki, "Six–Axis Force/Torque Sensor for Assembly Robots", Fujitsu Sci. Tech. J., 26, Apr. 1990, pp. 41–47.
Yotaro Hatamura et al., "A New Design For 6–Component Force/Torque Sensors", Mechanical Problems in Measuring Force and Mass. ISBN 90–247–3346–4, 1986, pp. 39–48. no month.

Primary Examiner—Max H. Noori
Attorney, Agent, or Firm—Jacobson, Price, Holman & Stern, PLLC

[57] ABSTRACT

A 6-component load cell used for measuring triaxial force and moment components is disclosed. The load cell has a sensing unit and an external case. In the sensing unit, upper and lower rings individually have a plurality of connectors and arcuate thick parts. The sensing unit also has a cross beam, consisting of horizontal and vertical parts crossing at right angles with a plurality of vertical and transverse binocular openings being formed on the two parts. A radial slit is formed at each corner of the junction of the cross beam. A plurality of strain gauges are attached to the cross beam. The external case has upper and lower parts, individually having a plurality of arcuate openings corresponding to the arcuate thick parts of the sensing unit. The lower part of the case also has a plurality of cord lead openings at the side wall.

5 Claims, 6 Drawing Sheets

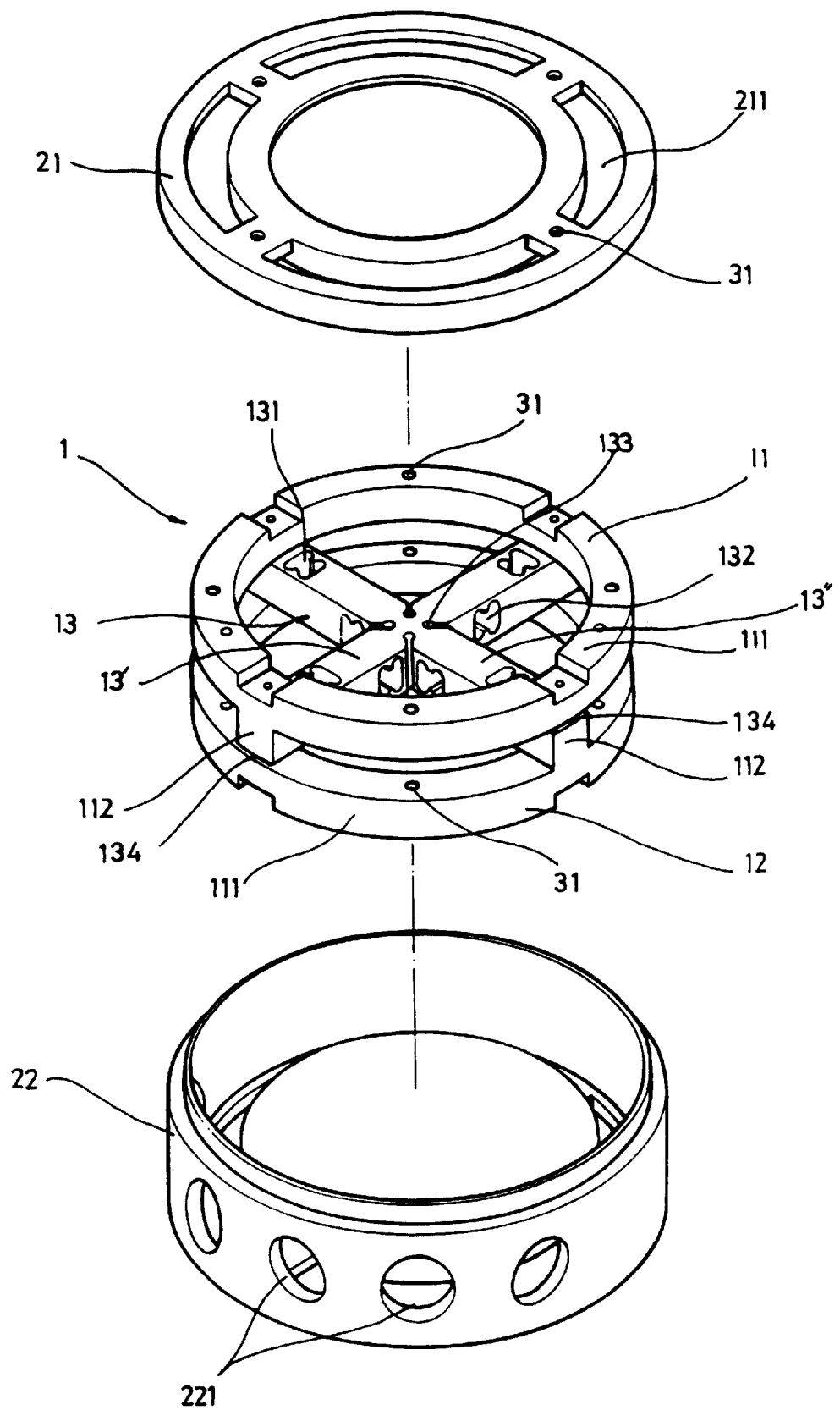

6-COMPONENT LOAD CELL

BACKGROUND OF THE INVENTION

1. Field of the Invention

The present invention relates to a 6-component load cell capable of measuring triaxial force components (Fx, Fy, Fz) and triaxial moment components (Mx, My, Mz) simultaneously.

2. Description of the Prior Art

In the prior art, a load cell or a force measuring sensor is designed to measure a uniaxial force so that in order to obtain reliable sensing results, the typical load cell has to be installed in a direction where the force to be measured acts. However, due to the recent trend of both automation of mechanical systems and development of machine tools, it is necessary to precisely measure multiaxial force and moment components simultaneously. In an effort to achieve such a necessity of multiaxial measurement, a plurality of load cells may be installed in different axes. However, the above method using several cells is problematic in that it is space consuming thus being unadaptable in the event of limited space. In this regard, a force measuring sensor given the term "multi-component load cell" is proposed and used for measuring multiaxial force and moment components simultaneously.

Several-types of multi-component load cells are proposed in the prior art. Sceinman proposes a multi-component load cell, in which four deflection bars cross at right angles, with 16 semiconductor strain gauges individually being installed on each side wall of each deflection bar and being formed into a bridge. The output voltage of each strain gauge is in proportion to the force component acting in a direction perpendicular to the surface of each strain gauge. Therefore, it is possible to measure triaxial force and moment components simultaneously by appropriately doing sums of the output voltages of the 16 strain gauges. The Sceinman's load cell is advantageous in that it is somewhat easily produced through a simple process but is problematic in that it has a measuring error of about 5% thus having an inferior precision. Another problem of the Sceinman's load cell resides in that it does not directly measure the force and moment components, but arithmetically measures the components, thus being time consuming.

Yabaki proposes a multi-component load cell, in which 8 parallel leaf springs form an elastic crossing structure with 6 Wheatstone bridges constituting 24 thin strain gauges. The Yabaki's load cell directly measure the triaxial force and moment components without processing an arithmetic calculation. However, the above load cell has a measuring error of 2% while measuring the force components and 3–5% while measuring the moment components.

Hatamura proposes a 6-component load cell, which comprises a force component measuring parallel plate and a moment measuring radial plate. The Hatamura's load cell has a high precision with a measuring error of about 2% while measuring force components and about 3% while measuring moment components. However, the above load cell is problematic in that it is difficult to produce the cell.

SUMMARY OF THE INVENTION

Accordingly, the present invention has been made keeping in mind the above problems occurring in the prior art, and an object of the present invention is to provide a 6-component load cell, which is easily produced and allows strain gauges to be easily attached to a sensing unit and has a high measuring precision with an interference error of not higher than 2% in the measuring of force and moment components.

In order to accomplish the above object, the present invention provides a 6-component load cell used for measuring triaxial force components and triaxial moment components simultaneously, comprising a sensing unit measuring the triaxial force and moment components and an external case encasing the sensing unit. The sensing unit has upper and lower rings, which individually have a plurality of diametrically opposite connectors, locking holes and arcuate thick parts. The sensing unit also has a cross beam, which has horizontal and vertical parts crossing at right angles. In the cross beam, a plurality of vertical and transverse binocular openings are formed on the horizontal and vertical parts and individually have a binocular cross-section. In addition, four radial slits are formed at the four corners of the junction of the horizontal and vertical parts. A plurality of strain gauges are attached to the cross beam. Meanwhile, the external case consists of upper and lower parts, which individually have both a plurality of locking holes and a plurality of arcuate openings corresponding to the arcuate thick parts of each of the upper and lower rings of the sensing unit. The lower part of the case has a plurality of cord lead openings at the side wall, thus allowing input and output cords of the sensing unit to pass through.

In the above 6-component load cell, the horizontal and vertical parts of the cross beam are spaced apart from the lower and upper rings by a gap respectively but are connected to the upper and lower rings through the connectors, thus integrating the sensing unit into a single structure.

The radial slits of the cross beam reduce the interference error of bending moment components to an acceptable value of not higher than 2%.

The strain gauges are attached to the cross beam at positions with both maximum strain and offset interference strain while force or moment acts on the binocular openings.

In order to measure the triaxial force and moment components, the strain gauges are formed into a Wheatstone bridge circuit.

The arcuate thick parts of the sensing unit are brought into slidable engagement with the arcuate openings of the external case.

FIG. 1a shows the sensing unit of a load cell, which has a binocular opening and is used for measuring an uniaxial force. FIG. 1b is a graph showing distribution of strain ratio on the top side of the sensing unit. FIG. 1c is a view of the sensing unit of FIG. 1a after straining the unit by force F.

As shown in FIG. 1a, one end of the sensing unit is a fixed end, while the other end is a free end so that the unit forms a cantilever body. Four strain gauges S1 to S4 are attached to the top and bottom sides of the fixed and free ends of the unit, respectively. When force F acts on the top side of the free end of the unit, the sensing unit is strained as shown in FIG. 1c. In this case, the strain ratio on the top side of the sensing unit is distributed as shown in FIG. 1b. The distribution of strain ratio on the bottom side of the unit is diametrically opposed to that of the top side.

The 1st and 4th strain gauges S1 and S4 of the sensing unit sense tensile strain, while the 2nd and 3rd strain gauges S2 and S3 sense compression strain. When the two tensile strain gauges S1 and S4 and the two compression strain gauges S2 and S3 constitute a Whetstone bridge with a bridge arm in the order of S1, S4, S2 and S3, the sensing unit forms a load cell sensing the force F.

BRIEF DESCRIPTION OF THE DRAWINGS

The above and other objects, features and other advantages of the present invention will be more clearly understood from the following detailed description taken in conjunction with the accompanying drawings, in which:

FIG. 3b is a view of a Wheatstone bridge used for measuring the force Fy in the sensing unit of FIG. 3a;

FIG. 3c is a view of a Wheatstone bridge used for measuring the moment Mz in the sensing unit of FIG. 3a;

FIG. 5 is in exploded perspective view of the 6-component load cell of the invention;

FIG. 6b is a view showing the structure of a Wheatstone bridge of FIG. 6a.

DESCRIPTION OF THE PREFERRED EMBODIMENTS

Figure 1A:
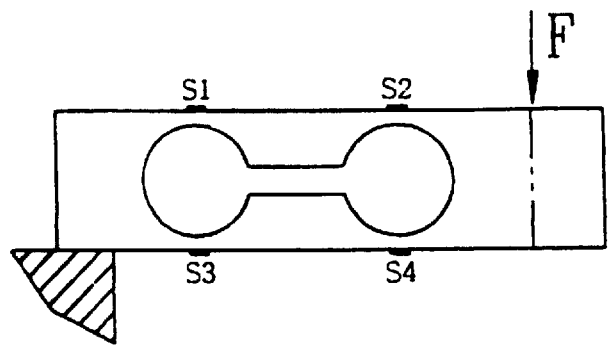
FIG. 1a is a view showing the sensing unit of a load cell, having a binocular opening and being used for measuring a uniaxial force.
Figure 1B:
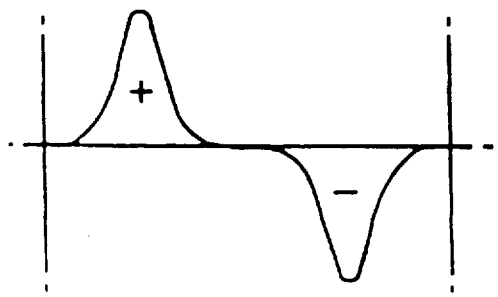
FIG. 1b is a graph showing distribution of strain ratio on the top side of the sensing unit.
Figure 1C:
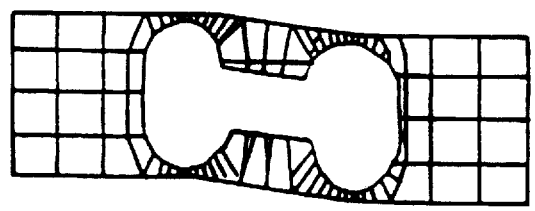
FIG. 1c is a view of the sensing unit of FIG. 1a after straining the unit by force F.
Figure 2A:
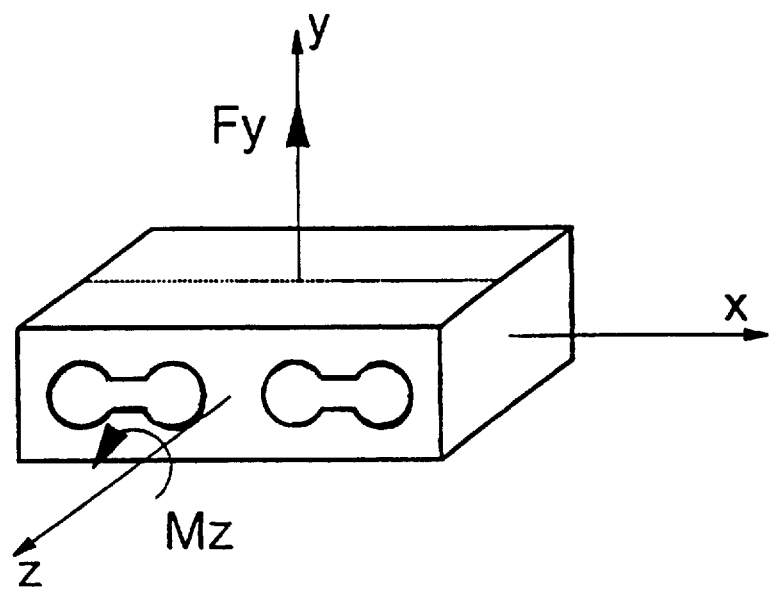
FIG. 2a is a perspective view of the sensing unit of a 2-component load cell.
Figure 2B:
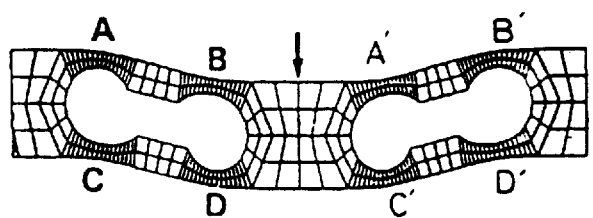
FIG. 2b is a view showing a strain of the sensing unit of FIG. 2a when force Fy acts on the unit as shown in the arrow.
Figure 2C:
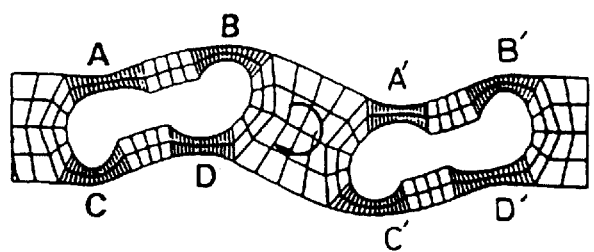
FIG. 2c is a view showing a strain of the sensing unit of FIG. 2a when moment Mz acts on the unit as shown in the arrow.

FIG. 2a shows the sensing unit of a 2-component load cell formed from the load cell of FIG. 1a. FIG. 2b shows a strain of the sensing unit of FIG. 2a when force (Fy) acts on the unit. FIG. 2c shows a strain of the sensing unit of FIG. 2a when moment (My) acts on the unit.

As shown in FIG. 2a, the 2-component load cell can measure both the y-axial force component and the z-axial moment component. The strain on the 2-component load cell with the force Fy is shown in FIG. 2b, while the strain on the 2-component load cell with the moment Mz is shown in FIG. 2b. The strain at each of the positions A, B, C, D, A', B', C' and D' of the 2-component load cell with both the force Fy and the moment Mz is given in the following Table 1.

TABLE 1

Strain on 2-component load cell with force and moment

|    | A (SG1) | B (SG2) | C (SG8) | D (SG7) | A' (SG3) | B' (SG4) | C' (SG6) | D' (SG5) |
|----|---------|---------|---------|---------|----------|----------|----------|----------|
| Fy | 250     | −250    | −250    | 250     | −250     | 250      | 250      | −250     |
| Mz | −136    | 688     | 136     | −688    | −688     | 136      | 688      | −136     |

Figure 3A:
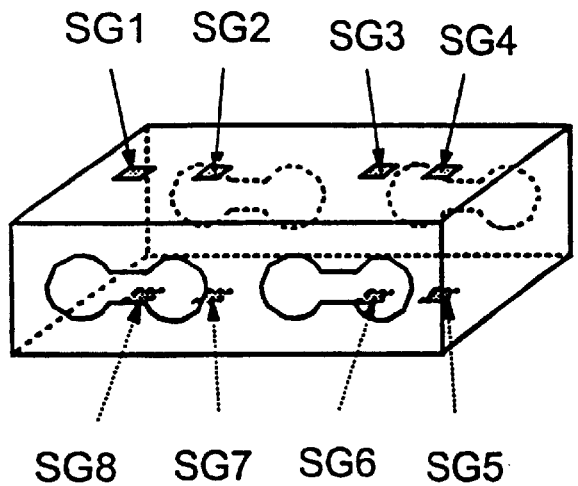
FIG. 3a is a perspective view of the sensing unit of a load cell with 8 strain gauges.
Figure 3B:
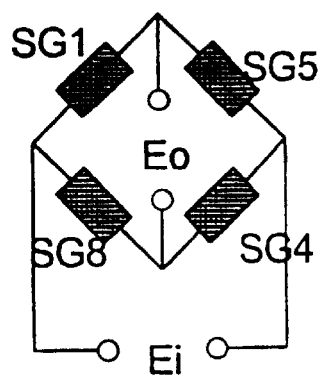
Figure 3C:
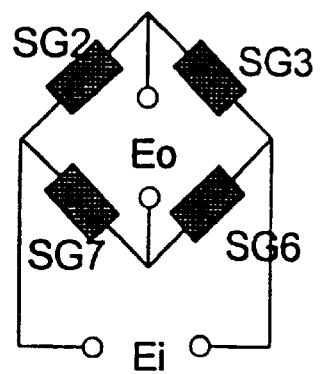

FIG. 3a shows the sensing unit of a load cell with 8 strain gauges. FIG. 3b and 3c show the structure of Wheatstone bridges of the sensing unit of FIG. 3a, with the Wheatstone bridge of FIG. 3b forming a load cell measuring the force Fy and the Wheatstone bridge of FIG. 3c forming a load cell measuring the moment Mz.

That is, the strain gauges 1, 4, 5 and 8 are used for sensing the force Fy, while the other strain gauges 2, 3, 6 and 7 are used for sensing the moment Mz. In the above load cell with 8 strain gauges, the output signals Fy and Mz are expressed as follows.

$$Fy: Eo/Ei = K/4(SG1-SG5+SG4-SG8)$$

$$Mz: Eo/Ei = K/4(SG2-SG3+SG6-SG7)$$

In the above expressions, K denotes a constant (generally 2).

In the Fy load cell, the force Fy results in an output signal Eo/Ei of 500 $\mu$m/m, while the moment Mz results in an output signal Eo/Ei of 0 $\mu$m/m. Meanwhile, in the Mz load cell, the force Fy results in an output signal Eo/Ei of 0 $\mu$m/m, while the moment Mz results in an output signal Eo/Ei of 1,376 $\mu$m/m.

The Fy and Mz load cells are formed by the Wheatstone bridge circuits of FIG. 3b and 3c respectively, with the sensing unit structure of FIG. 2a and 8 strain gauges (SG1 to SG8) being attached at the positions A, B, C, D, A', B', C' and D' of the sensing unit. The Fy and Mz load cells are free from any interference between them thus resulting in an interference error of zero.

Figure 4:
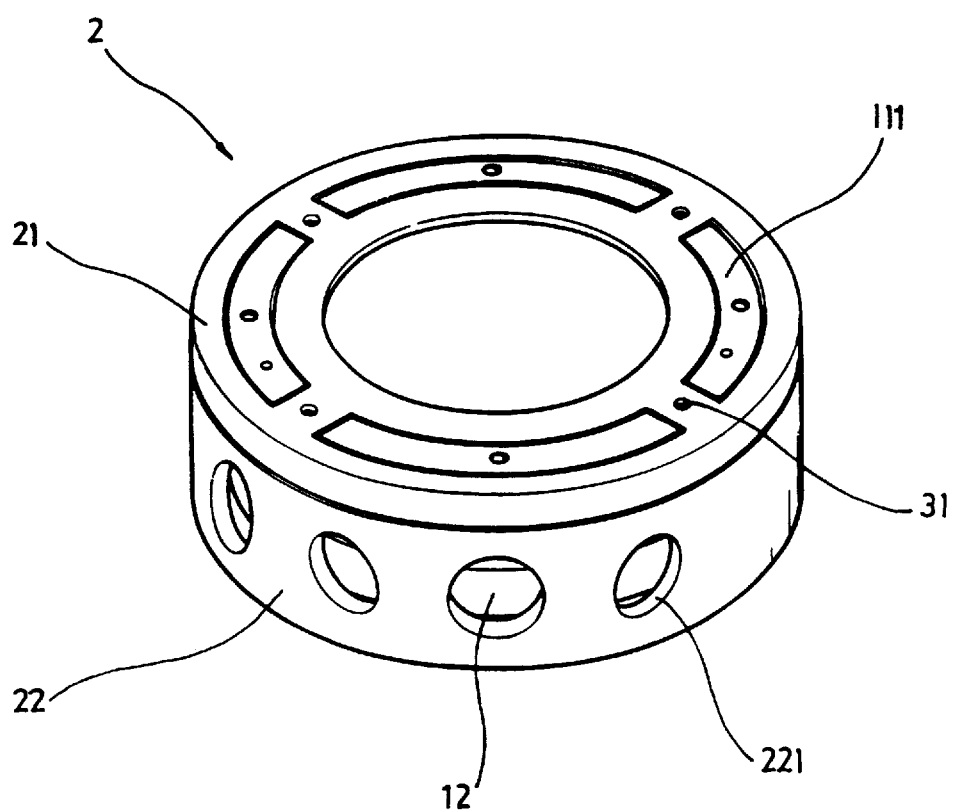
FIG. 4 is a perspective view of a 6-component load cell measuring triaxial force and moment components in accordance with the preferred embodiment of this invention.

FIG. 4 is a perspective view of a 6-component load cell capable of measuring triaxial force components (Fx, Fy, Fz) and triaxial moment components (Mx, My, Mz) simultaneously in accordance with the preferred embodiment of this invention. FIG. 5 is an exploded perspective view of the 6-component load cell.

As shown In FIGS. 4 and 5, the 6-component load cell generally comprises two parts: a sensing unit 1 and an external case 2i. The sensing unit 1 includes upper and lower rings 11, 12 and a cross beam 13, while the external case 2 includes a lid type upper part 21 and a container-type lower part 22.

The sensing unit 1 of the 6-component load cell is formed into a single structure by a wire cutting machine thus effectively reducing the assembling error while assembling a plurality of reduced load cells. The cross beam 13 of the sensing unit 1 comprises a horizontal part 13' and a vertical part 13". The horizontal part 13' of the beam 13 is connected to the upper ring 11 through a connector 112 but is spaced apart from the lower ring 12 by a gap 134. In the same manner, the vertical part 13" is connected to the lower ring 12 through a connector 112 but is spaced apart from the upper ring 11 by a gap 134. The two parts 13' and 13" of the cross beam 13 are connected to the upper and lower rings 11 and 12 at right angles so that the sensing unit 1 is integrated into a single structure.

For ease of description, the construction of the integrated sensing unit 1 will be described hereinbelow by the sectioned elements: the upper ring 11, lower ring 12 and cross beam 13.

Each of the upper and lower rings 11 and 12 includes a plurality of arcuate thick parts 111, connectors 112 and locking holes 31. The thick parts 111 are arranged at diametrically opposite positions on each ring 11, 12 and such a diametric opposite arrangement is applied to both the connectors 112 land the locking holes 31. The number of thick parts 111 is the same as that of arcuate openings 211 of the external case 21 thus allowing the sensing unit 1 to be brought into slidable engagement with the external case 2. The number and position of the locking holes 31 are the same as those of the locking hoses 31 of the external case 2.

As described above, the cross beam 13 of the sensing unit 1 comprises the horizontal and vertical parts 13' and 13". The horizontal and vertical parts 13' and 13" are spaced apart from the lower and upper rings 12 and 11 by the micro gaps 134, respectively. Each of the horizontal and vertical parts 13' and 13" has two vertical openings 131 at the outside portions and two transverse openings 132 at the inside portions so that the cross beam 13 has four vertical openings 131 and four transverse openings 132. Each of the openings 131 and 132 has a binocular cross-section. In the cross beam 13, the four corners of the junction are slitted inwardly in a radial direction thus forming four radial slits 133 with the inside end of each radial slit being rounded. Due to the radial slits 133 with the rounded inside ends, the interference error of the bending moment components Mx and My is effectively reduced to an acceptable value of not higher than 2%. In the cross beam 13, a plurality of strain gauges S1 to S32 are attached to the cross beam 13 at positions with both the maximum strain and the offset interference strain while force or moment acts on the binocular openings 131 and 132.

In the preferred embodiment shown in the drawings, the vertical openings 131 are formed at the outside portions of the cross beam 13, while the transverse openings 132 are formed at the inside portions. However, it should be understood that the positions of the vertical and transverse openings 131 and 132 may be reversed.

The external case 2 comprises the lid-type upper part 21 and the container-type lower part 22, each of which has a plurality of diametrically opposite locking holes 31. Each of the the two parts 21 and 22 of the case 2 also has a plurality of arcuate openings 211, corresponding to the arcuate thick parts 111 of each of the upper and lower rings 11 and 12 of the sensing unit i, so that each part 21, 22 is brought into slidable engagement with each of the upper and lower rings 11, 12. The side wall of the lower part 22 of the case 2 is provided with a plurality of cord lead openings 221 which allow input and output cords to pass through.

Figure 6A:
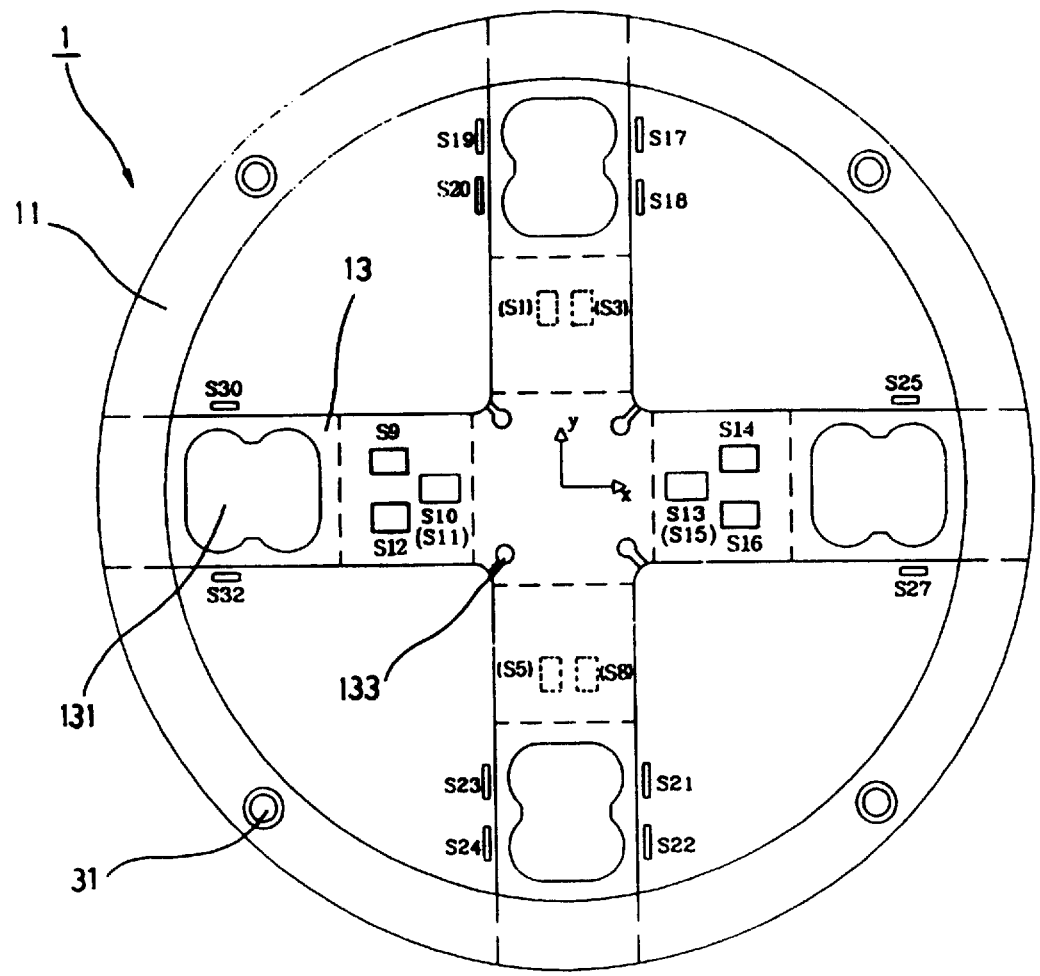
FIG. 6a is a view showing the positions of strain gauges of the 6-component load cell of the invention.

FIG. 6a shows the positions of the strain gauges of the 6-component load cell according to this invention.

In FIG. 6a, the strain gauges S1, S3, S5, S8, S11 and S15 are attached to the bottom surface of the cross beam 13, while the strain gauges S17 to S25, S27, S30 and S32 are attached to the side surfaces of the cross beam 13.

Figure 6B:
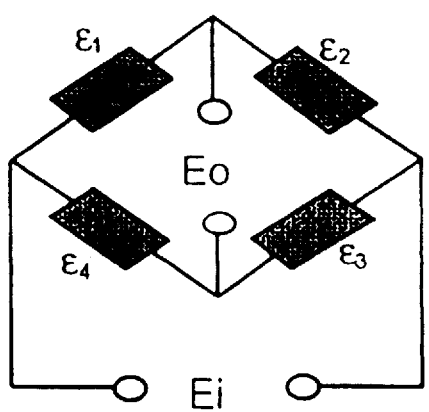

FIG. 6b shows the structure of a Wheatstone bridge of FIG. 6a. The positions of the strain gauges corresponding to the triaxial force and moment components acting on the load cell are given in the following Table 2.

TABLE 2

Positions of Strain Gauges
Corresponding to the Triaxial Force and Moment Components

|    | ε1  | ε2  | ε3  | ε4  |
|----|-----|-----|-----|-----|
| Fx | S19 | S17 | S24 | S22 |
| Fy | S30 | S32 | S25 | S27 |
| Fz | S11 | S10 | S15 | S13 |
| Mx | S1  | S5  | S3  | S8  |
| My | S9  | S14 | S12 | S16 |
| Mz | S20 | S23 | S21 | S18 |

As described above, the present invention provides a 6-component load cell capable of measuring triaxial force components (Fx, Fy, Fz) and triaxial moment components (Mx, My, Mz) simultaneously. The 6-component load cell of this invention is easily produced and allows strain gauges to be easily attached to a sensing unit and has a high measuring precision with an interference error of not higher than 2% while measuring force and moment components. The above load cell is thus effectively used in various industrial fields, for example, studying in operational performance and functional improvement of up-to-date industrial machinery, designing of automobile axles, and structural designing of buildings.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A 6-component load cell used for measuring triaxial force components and triaxial moment components simultaneously, comprising a sensing unit adapted for measuring the triaxial force and moment components, said sensing unit comprising:

a cross beam having horizontal and vertical parts crossing at right angles, with a plurality of vertical binocular openings formed at the outside portions and a plurality of transverse binocular openings formed at the inside portions on said horizontal and vertical parts and each of the openings individually having a binocular cross-section, and four radial slits being formed at the four inside corners of the junction of the horizontal and vertical parts; and a plurality of the strain gauges attached to the bottom surfaces and a plurality of the strain gauges attached to the side surfaces of said cross beam;

wherein the radial slits of the cross beam reduce the interference error of bending moment components to an acceptable value of net higher than 2%.

2. The 6-component load cell according to claim 1, wherein said horizontal and vertical parts of the cross beam are spaced apart from said lower and upper rings by a gap respectively but are connected to the upper and lower rings through the connectors, thus integrating the sensing unit into a single structure.

3. The 6-component load cell according to claim 1 wherein said arcuate thick parts of the sensing unit are brought into slidable engagement with said arcuate openings of the external case.

4. The 6-component load cell according to claim 1, wherein said strain gauges are attached to the cross beam at positions with both maximum strain and offset interference strain while force or moment acts on said binocular openings.

5. The 6-component load cell according to claim 4, wherein said strain gauges are formed into a Wheatstone bridge circuit, thus measuring the triaxial force and moment components.

* * * * *